June 18, 1929.  A. J. SINCLAIR  1,717,524

ENGINE SUPPORT

Filed March 26, 1927

INVENTOR
ALFRED J. SINCLAIR
BY
*Irving Harness*
ATTORNEY

Patented June 18, 1929.

1,717,524

UNITED STATES PATENT OFFICE.

ALFRED J. SINCLAIR, OF DETROIT, MICHIGAN, ASSIGNOR TO CHRYSLER CORPORATION, OF HIGHLAND PARK, MICHIGAN, A CORPORATION OF DELAWARE.

ENGINE SUPPORT.

Application filed March 26, 1927. Serial No. 178,636.

My invention relates to engine supports for internal combustion engines and is, more specifically, a resilient supporting unit designed to support an engine in a vehicle and to dampen out the vibration of the engine so as not to transmit it to the frame of the vehicle.

An internal combustion engine, when running has a certain period of vibration and if bolted securely to the frame of a vehicle, will cause the entire vehicle to vibrate in unison therewith.

A common practice is to support the engine in the vehicle frame on springs or rubber blocks. These methods have not proved satisfactory because springs are subject to crystallization throughout their structure, due to continuous vibration, and are apt to break while rubber blocks are too resilient and the engine has a tendency to vibrate excessively.

My invention uses the rubber block support and in addition I have made use of two sets of plates frictionally in engagement with each other to thereby form a large friction surface to dampen out any objectionable vibration of the engine.

The manner in which my invention produces the desired result will be better understood from the following description taken in connection with the drawings, in which.

Figure 1:
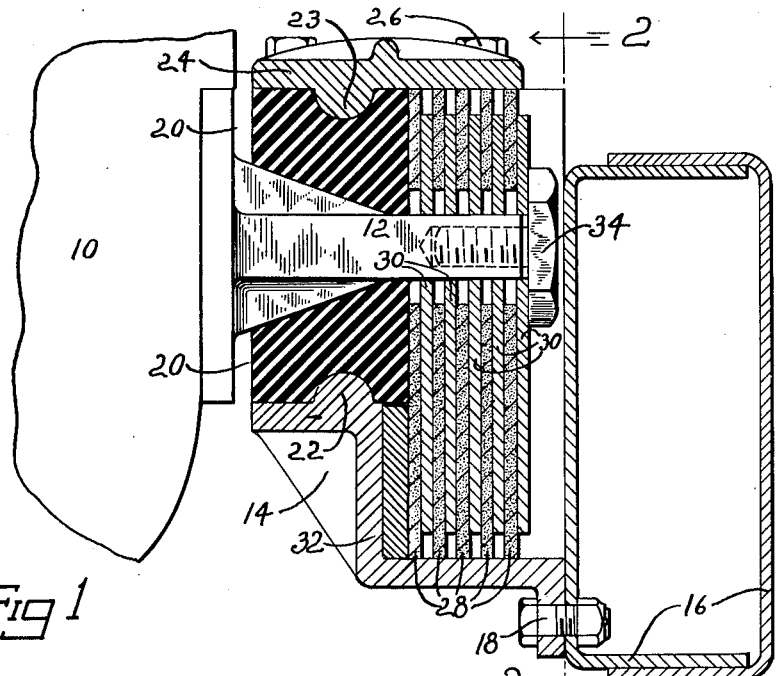
Fig. 1 is a sectional view of a supporting element embodying my invention.
Figure 2:
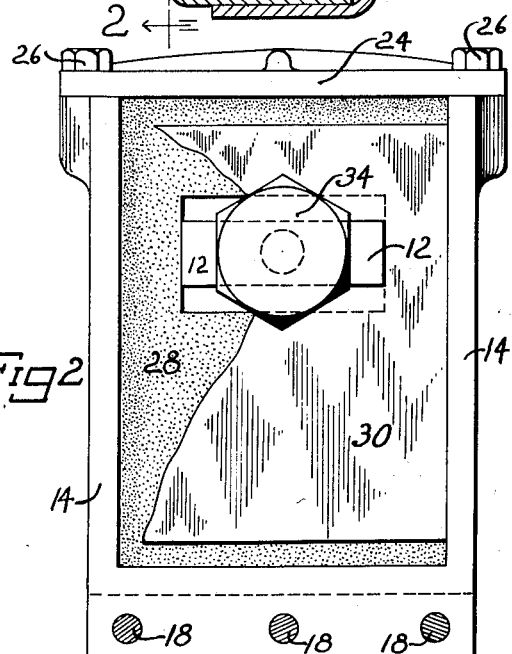
Fig. 2 is a view on line 2—2 of Fig. 1, parts being broken away.

Referring to Figs. 1 and 2 of the drawings, there is shown an engine crankcase 10 having a rectangular supporting lug 12 which projects thru a supporting member 14, said supporting member being secured to a vehicle frame 16 by bolts 18. It will be understood, of course, that while I have shown only one side of the engine and one mounting therefor, the other side of the engine is mounted in the same manner as the one shown.

The supporting member 14 has a rubber block 20 held in place by a projection 22 at the bottom of the support 14 and a projection 23 on a cover plate 24 at the top.

Bolts 26 hold the cover plate 24 to the supporting member 14. The rubber block 20 has a rectangular hole thru it which is adapted to receive the engine supporting lug 12. Loosely surrounding the lug 12 and snugly fitting the housing 14 are a number of friction plates 28, preferably fibre, and between each of the plates 28 there is a friction plate 30, preferably steel. The latter mentioned plates 30 fit loosely in the housing 14 but fit snugly around the rectangular supporting lug 12. Frictional engagement between the plates 28 and 30 is adjustably accomplished by forcing them against a resilient rubber block 32 and the block 20 by a capscrew 34.

It will be apparent that the engine arm 12 is held in the rubber block 20 and supported from the frame thru the same and that the only function of the plates 28 and 30, is to dampen, thru friction, vibration of the arms in rubber.

It will also be apparent that by alternating steel and fiber plates friction is increased and noise lessened as distinguished from the result of providing all of the plates of steel. By varying the number of plates 28 and 30 a different coefficient of friction between the engine and the frame may be obtained, and different magnitudes of vibration may be checked or controlled.

Figure 3:
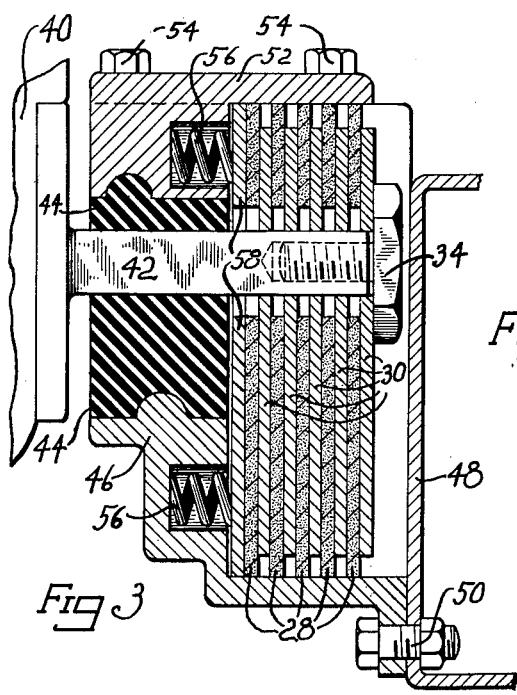
Fig. 3 is a sectional view of a modified form of a supporting element embodying my invention.

With reference to Fig. 3 of the drawing which illustrates a modified form of my invention, an engine crankcase 40 has a supporting lug 42 which is rectangular in cross section and projects thru a rectangular hole in a rubber block 44. The rubber block 44 is supported by a housing 46 which is bolted to a vehicle frame 48 by bolts 50. The block is held in said housing by a cover plate 52 which is bolted to the housing 48 by bolts 54.

The plates 28 and 30 are the same as those in Fig. 1 and are held by the cap screw 34. In order to increase the frictional engagement of the plates 28 and 30 one with the other, I have imbedded in the supporting housing 46 and cover plate 52, springs 56, which bear against plate 58 and have a tendency to force plates 28 against plates 30 and thereby increase their frictional engagement with each other.

It will be obvious that various changes may be made in the arrangement, combination and construction of the various parts of my improved device, without departing from the spirit of my invention and it is my intention to cover by my claims such changes as may be included therein.

What I claim is:

1. In combination, an internal combustion engine having supporting arms extended therefrom, a supporting element, resilient means supporting the arms in said supporting element, and frictional means for restricting vibration of the arms in the resilient support.

2. In combination, an internal combustion engine having a supporting arm extended therefrom, a supporting element, resilient means supporting the arm in said supporting element, and members supported from the arms and supporting element respectively, in frictional engagement with each other.

3. In combination, an internal combustion engine having a supporting arm extended therefrom, a supporting element, resilient means supporting the arm in said supporting element, and plates supported from the arms and supporting elements respectively, in frictional engagement with each other.

4. In combination, an internal combustion engine having supporting arms extending therefrom, a supporting element, resilient means supporting said arms in said supporting elements, and means for restricting vibration of the arms, comprising plates supported from said arms and supporting element respectively, frictionally engaging each other, certain of said plates being made of metal and others of fibrous material.

5. In combination, an internal combustion engine having supporting arms extending therefrom, a supporting element, resilient means supporting said arms in said supporting element, means for restricting vibration of said arms comprising plates supported from said arms and said supporting element, respectively, frictionally engaging each other, and means for varying the friction between said plates.

6. In combination, an internal combustion engine having supporting arms extended therefrom, a frame in which the engine is mounted, housings on the frame, a resilient member in each housing, said arms being each extended into a housing and encased by a resilient member, and frictional means in the housings for restricting vibration of the arms.

7. In combination, an internal combustion engine having supporting arms extended therefrom, a frame in which the engine is mounted, housings on the frame, a resilient member in each housing, said arms being each extended into a housing and encased by a resilient member, and members supported from said arms and frame, respectively, in frictional engagement with each other.

8. In combination, an internal combustion engine having supporting arms extended therefrom, a frame in which the engine is mounted, housings on the frame, a resilient member in each housing, said arms being extended into a housing and encased by a resilient member, and plates supported from said arms and frame, respectively in frictional engagement with each other.

9. In combination with an automotive engine having a supporting lug and a vehicle frame, means for supporting said engine in said frame consisting of a supporting housing, a rubber block in said housing surrounding said engine supporting lug to thereby support said engine, a plurality of plates supported by said engine supporting member, and other plates disposed between the first mentioned plates secured to said engine supporting lug, said plates being in frictional engagement with one another for preventing excessive vibration between said engine and said vehicle frame.

10. In combination, an internal combustion engine having supporting arms extending therefrom, a supporting element, resilient means supporting the arms in said element, plates supported from the arms and supporting element, respectively, and resilient means for forcing the plates into frictional engagement with each other.

11. In combination, an internal combustion engine having supporting arms extending therefrom, a supporting element, a rubber block supporting the arms in said supporting element, plates supported from the arms and supporting element respectively, and resilient means held under compression to force the said plates into frictional engagement with each other.

ALFRED J. SINCLAIR.